United States Patent [19]

Shirai et al.

[11] Patent Number: 5,337,222
[45] Date of Patent: Aug. 9, 1994

[54] AIMING LEVEL DEVICE FOR MOTOR VEHICLE HEADLAMP

[75] Inventors: Katutada Shirai; Hideharu Mochizuki; Osamu Sato; Hironori Tsukamoto; Hiroyuki Makita, all of Shizuoka, Japan

[73] Assignee: Koito Manufacturing Co., Ltd., Tokyo, Japan

[21] Appl. No.: 12,777

[22] Filed: Feb. 3, 1993

[30] Foreign Application Priority Data

| Feb. 18, 1992 | [JP] | Japan | 4-006402[U] |
| Apr. 14, 1992 | [JP] | Japan | 4-094244 |
| Jun. 19, 1992 | [JP] | Japan | 4-161082 |
| Sep. 14, 1992 | [JP] | Japan | 4-244527 |

[51] Int. Cl.$^5$ .................... B60Q 1/06
[52] U.S. Cl. .................... 362/66
[58] Field of Search ............ 362/66, 61

[56] References Cited

U.S. PATENT DOCUMENTS

| 4,802,067 | 1/1989 | Ryder et al. | |
| 5,083,244 | 1/1992 | Shirai et al. | 362/66 |
| 5,121,303 | 6/1992 | Shirai et al. | |
| 5,140,503 | 8/1992 | Lisak | |
| 5,253,154 | 10/1993 | McMahan et al. | 362/61 |

Primary Examiner—Carroll B. Dority
Attorney, Agent, or Firm—Sughrue, Mion, Zinn, Macpeak & Seas

[57] ABSTRACT

An aiming level device for a motor vehicle headlamp which has a short longitudinal length, requires a small number of components, and is simple to assemble. The inventive aiming level device includes a body member or base, a bubble vial supporting frame pivotable with respect to the body member, and a zero-point adjusting screw for holding a sideward extending part of the supporting frame. The bubble vial supporting frame, which is formed by cutting and bending a single thin metal plate, holds the bubble vial with parts continuously formed at a side region of the front-rear extending region of the frame to support the bubble vial at front and rear portions thereof, and the front and rear end portions of the front-rear extending region are held by the zero-point adjusting screw so that it is adjustable upward and downward by rotating the screw.

17 Claims, 17 Drawing Sheets

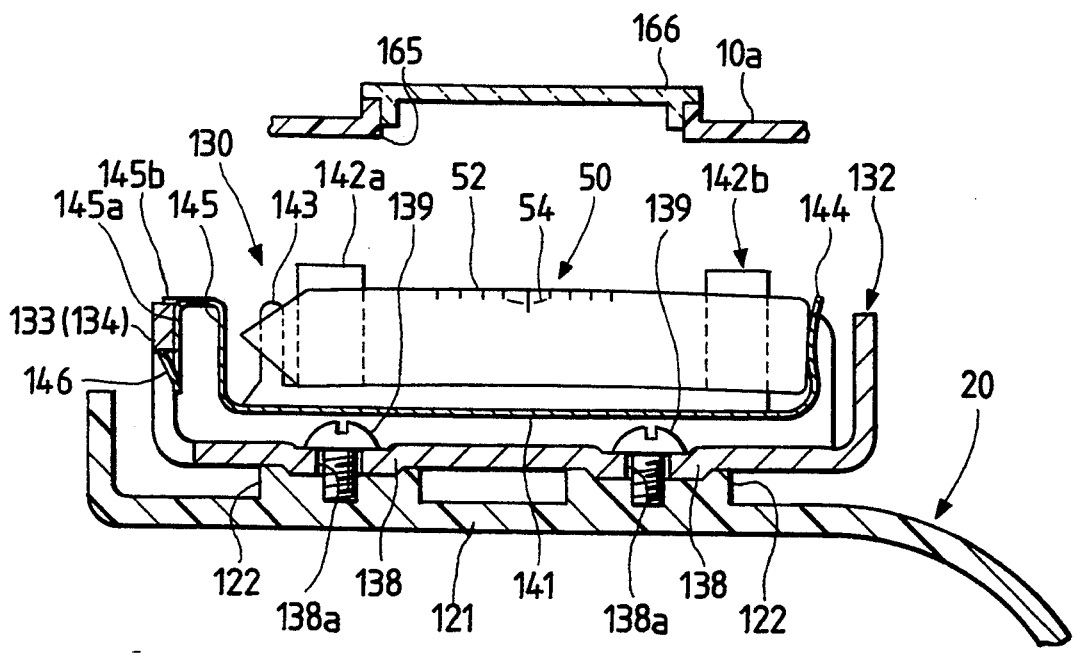
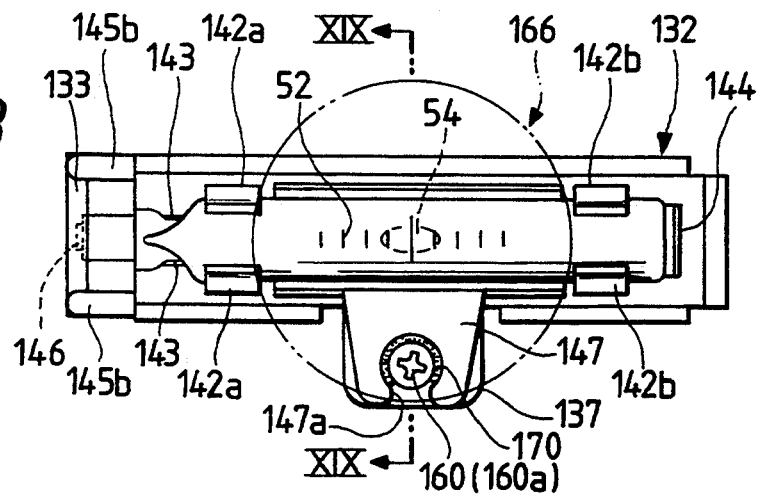
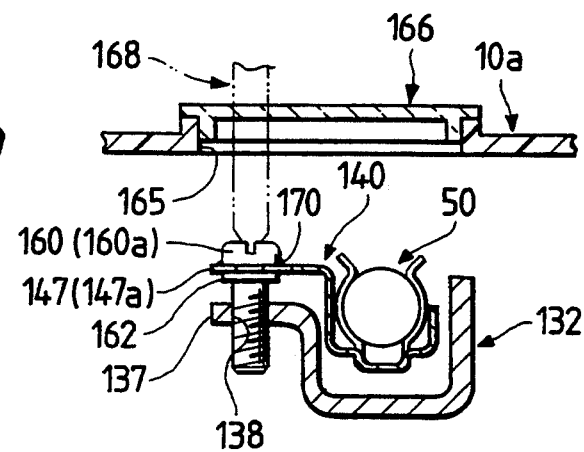

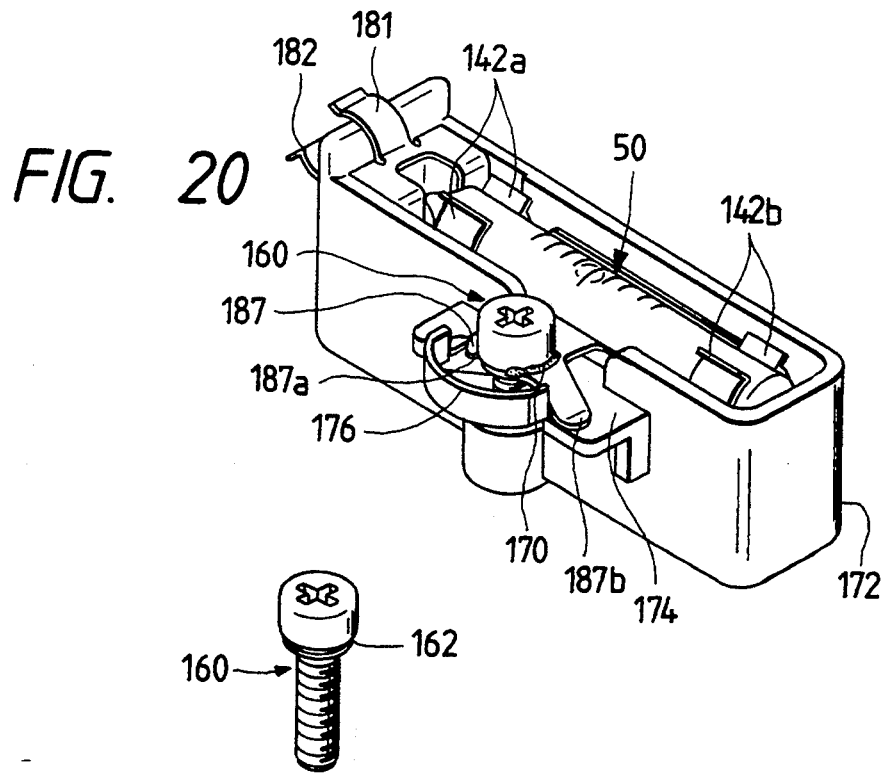
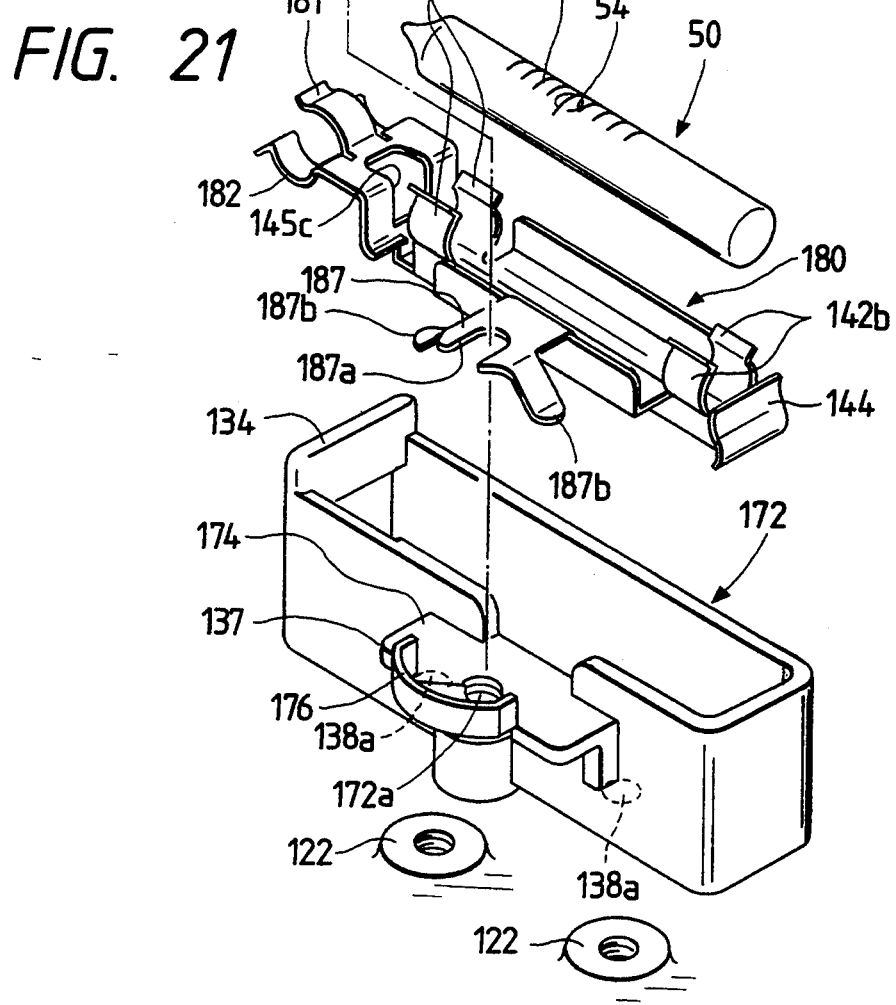

AIMING LEVEL DEVICE FOR MOTOR VEHICLE HEADLAMP

BACKGROUND OF THE INVENTION

The present invention relates to an aiming level device for a motor vehicle headlamp for measuring an amount of deviation of the light beam from the headlight in vertical and horizontal directions from a proper aiming direction. The level device is mounted on a reflector when applied to the headlamp of a movable reflector type, or mounted on the movable unit of lamp body and reflector when applied to the headlamp of a movable unit type.

In a conventional vehicular headlamp of a movable reflector type, as shown in FIG. 1, a reflector 2 on which is mounted a bulb 3 is pivotally supported with respect to a lamp body 1. The amount of deviation of the reflector in the vertical direction is measured with a level device 4 mounted on the reflector 2. As shown in FIGS. 2 and 3, the level device 4 is provided with a casing 5 having an opening directed upward and a lid 6, acting as a bubble vial supporting frame, supporting a bubble vial 7 and assembled on the casing 5. The conventional level device 4 is also provided with a zero-point adjusting screw 8a, a compression coil spring 8b, and concave and convex engaging parts 9a and 9b. The lid 6 is held by the screw 8a and resiliently engaged by the spring 8b. The position of a bubble contained within the bubble vial 7 is adjusted by adjusting an inclination angle of the lid 6 by rotating the screw 8a, whereby the zero-point of the level device can be adjusted. Reference character L (FIG. 1) and reference numeral 2a (FIG. 3) respectively indicate the optical axis of the headlamp and a plate-like extending part of the reflector 2 for mounting thereon the level device.

According to the conventional level device 4, however, since the lid 6 is supported by the zero-point adjusting screws at a side end part of the pivot point and the other end part, the total length of the level device is unavoidably long and therefore causes the following difficulties.

First, as shown in FIG. 3, since the level device 4, which is generally mounted on an upper wall of the reflector, is elongated in the longitudinal direction, the rear end portion of the level device protrudes a significant amount rearward from the reflector 2. Accordingly, the lamp body 1 in the case of a headlamp of the movable reflector type must have a great depth. Further, in case of a headlamp of the movable unit type, the headlamp unit must be spaced apart from the lamp housing. In either case, the headlamp must be large in size. In other words, the conventional level device cannot be applied to a compact headlamp, especially one having a small depth.

Second, generally the level device 4 is mounted on the reflector 2 inside the lamp body 1 in the case of a headlamp of the movable reflector type, an opening part 1a is formed on a lamp body 1 at a position corresponding to the level device 4, and a transparent removable viewing window 1b is fitted on the opening part 1a for reading a gauge of the level device 4. The zero-point of the bubble vial is adjusted by a screwdriver inserted through the opening 1a after removing the viewing window 1b. However, the viewing window 1b must be large both for purposes of reading the gauge of the bubble vial and for allowing the screwdriver to be inserted through the opening 1a. Accordingly, it is difficult to shape the opening part 1a and the viewing window 1b and, further, light may undesirably leak through the window 1b.

Further, since the conventional level device 4 is constituted by the casing 5, bubble vial 7, lid 6 for holding the bubble vial 7, zero-point adjusting screw 8a and compression coil spring 8b, the number of components is large, which makes the manufacturing cost high.

Furthermore, to assemble the conventional level device 4, since the bubble vial 7 is supported on the rear side of the lid 6, first the bubble vial 7 must be fitted on the arms 6a of the lid 6, and then the lid 6 carrying the bubble vial 7 is mounted on the casing 5. Accordingly, the required assembly steps are quite intricate.

SUMMARY OF THE INVENTION

The present invention was made in view of the foregoing difficulties and drawbacks accompanying the conventional level device. Accordingly, an object of the present invention is to provide an aiming level device for a motor vehicle headlamp which has a short longitudinal length.

Another object of the invention is to provide an aiming level device for a motor vehicle headlamp which requires a small number of components.

Still another object of the invention is to provide an aiming level device for a motor vehicle headlamp which is simple to assemble.

The above and other objects have been achieved by the provision of an aiming level device for a motor vehicle headlamp which, according to the invention, includes a casing, a bubble vial supporting frame pivotable with respect to the casing, and a zero-point adjusting screw for holding the sideward extending part of the supporting frame. The bubble vial supporting frame, which is formed by cutting and bending a single thin metal plate, holds the bubble vial with parts continuously formed at a side region of the front-rear extending region of the frame to support the bubble vial at front and rear portions thereof, and the front and rear end portions of the front-rear extending region are held by the screw so that it is adjustable upward and downward by rotating the screw.

BRIEF DESCRIPTION OF THE DRAWINGS

FIG. 17 is a cross-sectional view showing the level device of FIG. 16;

FIG. 18 is a plan view of the level device according to the fifth embodiment of the invention;

FIG. 19 is a lateral cross-sectional view of the level device of FIG. 18 taken along a line XIX—XIX in FIG. 18;

FIG. 20 is a perspective view of the aiming device according to a sixth embodiment of the invention;

FIG. 21 is an exploded perspective view of the level device shown in FIG. 20;

DESCRIPTION OF THE PREFERRED EMBODIMENTS

Preferred embodiments of the present invention will now be described in detail with reference to accompanying drawings.

Figure 1:
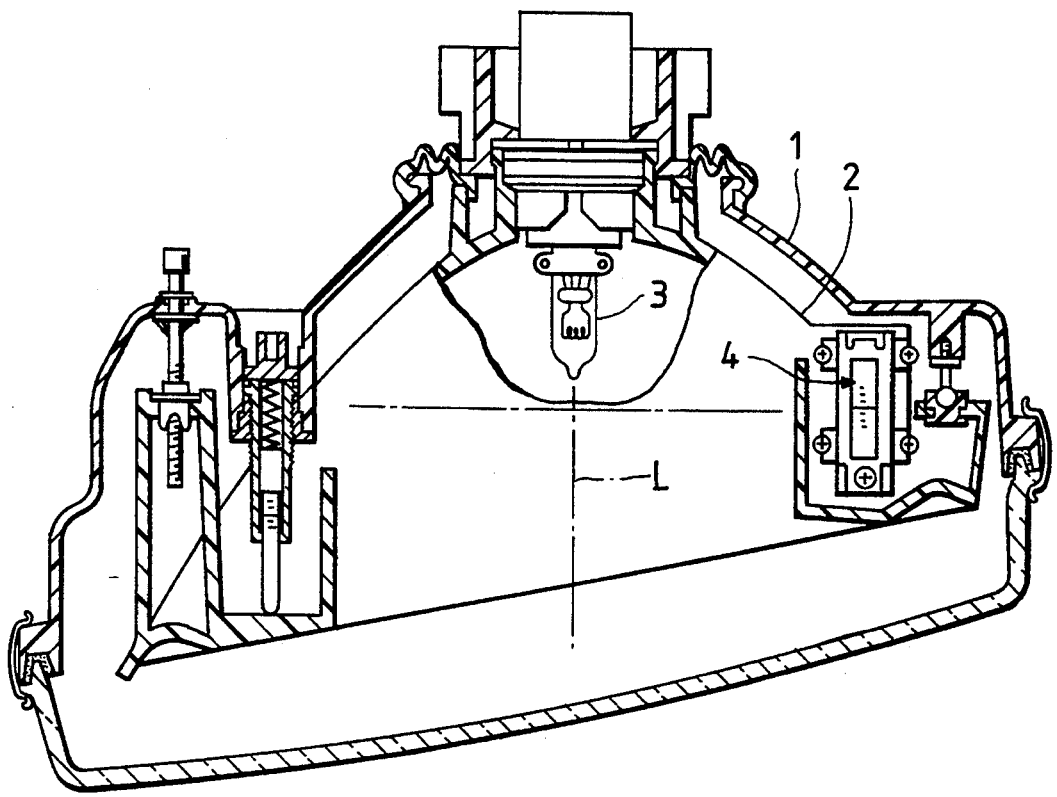
FIG. 1 is a horizontal cross-sectional view showing a headlamp for a motor vehicle on which a conventional level device is mounted.
Figure 2:
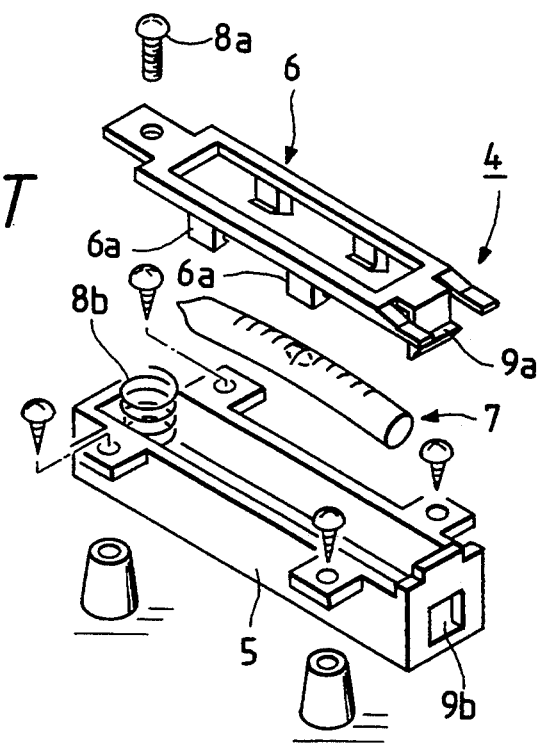
FIG. 2 is an exploded perspective view showing the conventional level device shown in FIG. 1.
Figure 3:
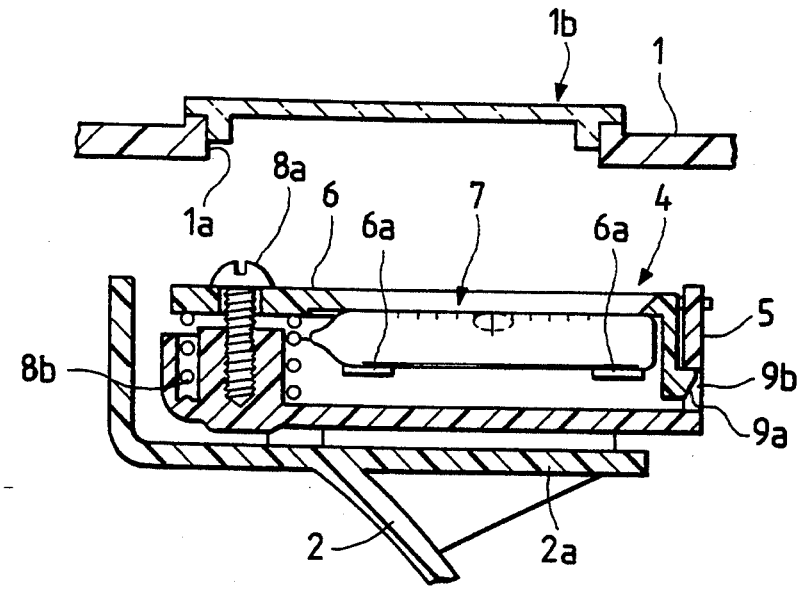
FIG. 3 is a vertical sectional view of the conventional level device.
Figure 4:
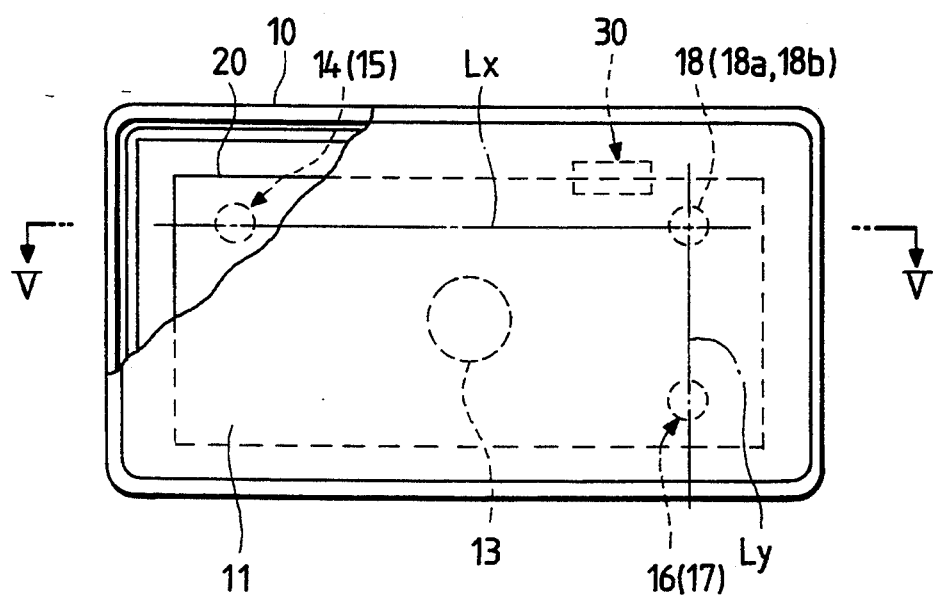
FIG. 4 is a front view of a headlamp of a movable reflector type on which is mounted an aiming level device according to a first embodiment of the invention.
Figure 5:
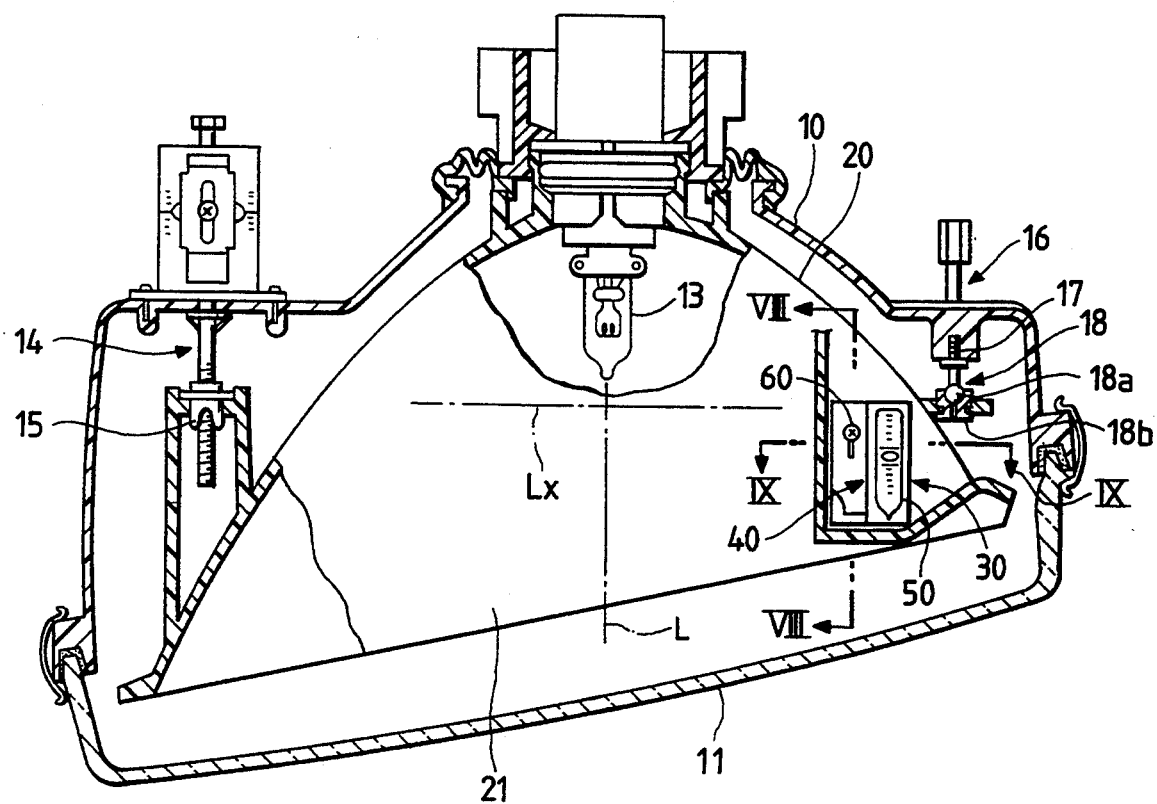
FIG. 5 is a horizontal sectional view of the headlamp shown in FIG. 4 taken along a line V—V in FIG. 4.
Figure 6:
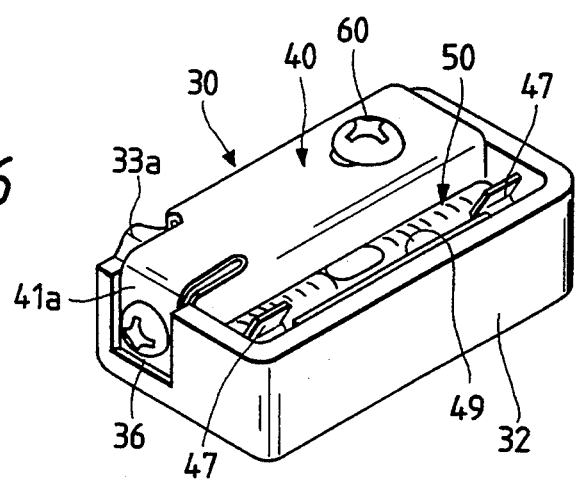
FIG. 6 is a perspective view showing an aiming level device of the first embodiment.
Figure 7:
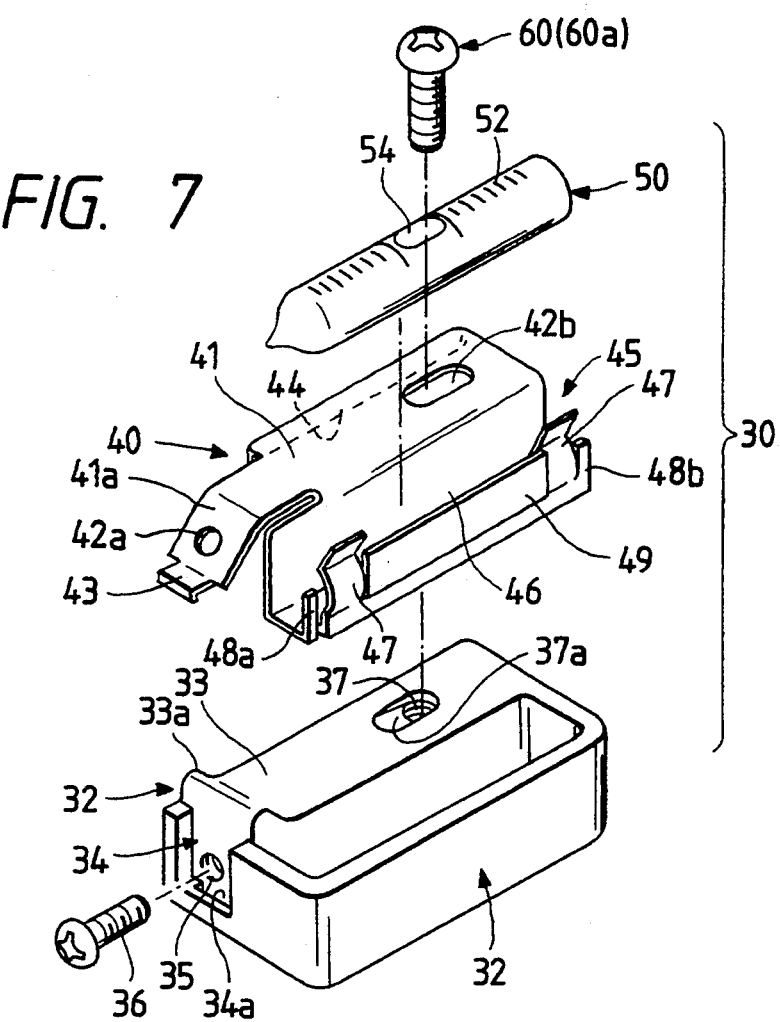
FIG. 7 is an exploded perspective view of the aiming level device shown in FIG. 6.
Figure 8:
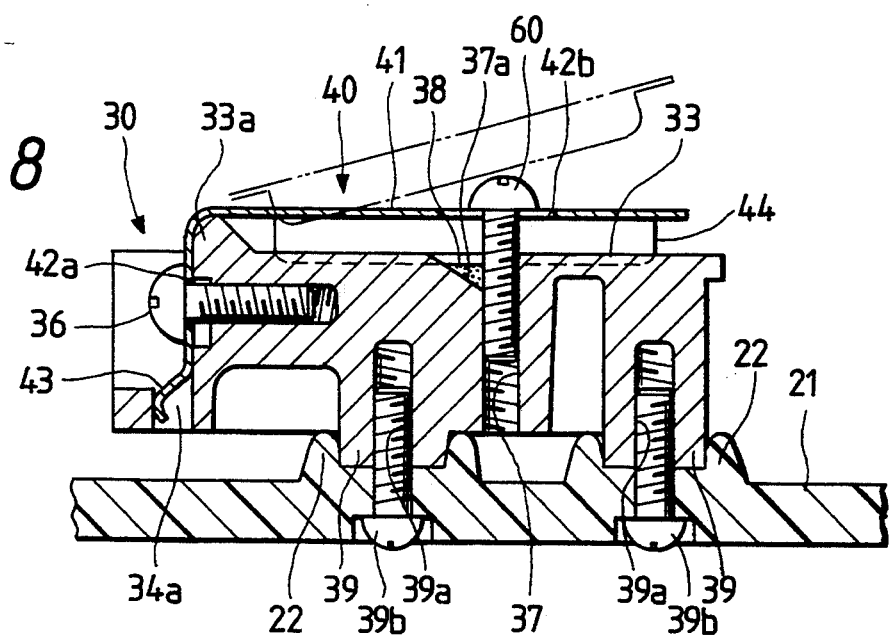
FIG. 8 is a cross-sectional view of the aiming level device mounted on a reflector taken along a line VIII—VIII in FIG. 5.
Figure 9:
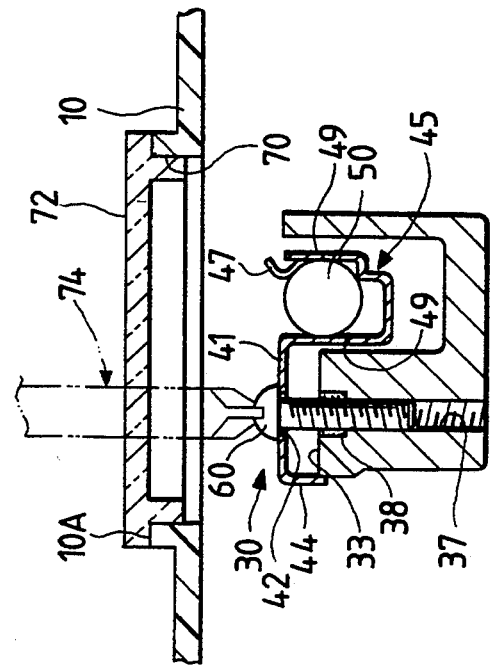
FIG. 9 is a lateral sectional view of the level device of FIG. 6 taken along a lines IX—IX in FIG. 5.
Figure 10:
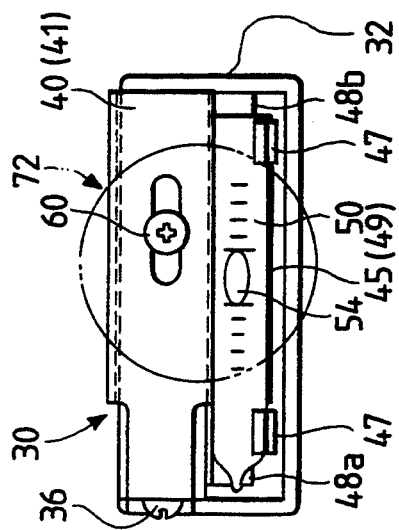
FIG. 10 is a plan view showing a zero-point adjusting screw and a viewing window according to the first embodiment.

FIGS. 4 through 10 show a first embodiment of the invention. Specifically, FIG. 4 is a front view of a headlamp of a movable reflector type on which is mounted an aiming level device according to the first embodiment of the invention, FIG. 5 is a horizontal sectional view of the headlamp shown in FIG. 4 taken along a line V—V in FIG. 4, FIG. 6 is a perspective view showing the aiming level device of this embodiment, FIG. 7 is an exploded perspective view of the aiming level device shown in FIG. 6, FIG. 8 is a cross-sectional view of the aiming level device mounted on a reflector taken along a line VIII—VIII in FIG. 5, FIG. 9 is a lateral sectional view of the level device taken along a line IX—IX in FIG. 5, and FIG. 10 is a plan view showing a zero-point adjusting screw and a viewing window.

As shown in these figures, a reflector 20 is pivotably supported on a box-shaped headlamp body 10 by a pair of aiming screws 14, 16 and a single ball joint 18. The screws 14, 16 penetrate through a rear wall of headlamp body 10 and are rotatably supported at respective penetrating portion of the body 10. The screws 14, 16 are threadedly engaged with brackets 15, 17, respectively, secured to a rear surface of the reflector 20. A ball part 18a of the ball joint 18 projects frontward from the rear wall of the lamp body 10, while a ball receiving part 18b fixed to the rear surface of the reflector 20 receives and supports the ball part 18a. When the screws 14, 16 are rotated, the brackets 15, 17 move back and forth along the axes of the screws 14, 16 so that the reflector 20 pivots along a horizontal axis Lx and a vertical axis Ly. In the drawings, reference numeral 11 designates a front lens and 13 a bulb acting as a light source mounted in a bulb mounting hole of the reflector 20.

A level device 30 is mounted on the upper wall 21 of the reflector 20 for detecting an amount of vertical deviation of the reflector 20 (amount of vertical deviation of the optical axis L of the headlamp). The level device 30 is provided with a rectangular-box-shaped casing 32 having an opening directed upward, a plate-spring-like bubble vial supporting frame 40 pivotably accommodated in the casing 32, a linear type bubble vial 50 supported by the supporting frame 40, and a zero-point adjusting screw 60 for adjusting the amount of deviation of the supporting frame 40, that is, the zero-point of the bubble vial 50.

The casing 32 is preferably formed of a light-weight and highly thermally conductive metal such as die-cast aluminum. The casing 32 has formed on a left side portion thereof (the left side part of the casing 32 shown in FIG. 9) a generally planar supporting frame receiving surface 33 extending frontward and rearward of the supporting frame 40. The supporting frame 40 is mounted on the frame receiving surface 33 so that a bubble vial holding region 45 of the supporting frame 40 is housed in the casing 32. The casing 32 is provided at a front end portion thereof with an concave portion 34 for mounting thereon and fixing thereto the supporting frame. A bent end portion 41a of the supporting frame 40 is mounted on the concave portion 34. A threaded hole 35 is formed in the concave portion 34 of the casing 32, into which hole a securing screw 36 is screwed so that the bent portion 41a of the supporting frame 40 is secured to and held by the concave portion 34.

A concave part 34a is formed at a bottom surface of the concave portion 34 for engaging an engaging claw 43 extending forward from the front end portion 41a of the supporting frame 40. Reference numeral 33a designates a raising part formed at a front end portion of the supporting frame receiving surface 33, along which part the supporting frame 40 pivots vertically. A threaded hole 37 is formed on the supporting frame receiving surface 33 at the rear side thereof (opposite to the side of the raising part 33a), and a zero-point adjusting screw 60 (described later) is threadedly engaged with the threaded hole 37. A cup-shaped bore 37a is formed around the threaded hole 37, and a silicone filler material 38 is filled in the threaded hole 37 through the bore 37a to prevent the zero-point adjusting screw 60 engaged with the threaded hole 37 from undesirably rotating due to vibration or the like. Since the bore 37a is cup-shaped, the filler material 38 is accurately filled in the threaded hole 37 located at the lowermost portion of the bore 37a. Further, as shown in FIG. 8, an engaging convex portion 39 and a screw through-hole 39a are formed at a left-lower surface of the casing 32 for engaging with a boss 22 projecting from an upper wall 21 of the reflector 20 so that the casing 32 can be secured to the upper wall 21 of the reflector 20 by a securing screw 39b.

As shown in FIG. 7, the supporting frame 40, which is formed by cutting and bending a single metal thin plate to a desired contour, is provided with a front-rear extending region 41 and a bubble vial holding region 45 extending parallel to the front-rear extending region 41. The bubble vial holding region 45 is U-shaped in cross section. A front end portion of the front-rear extending region 41 extends forward and separates from the bubble vial holding region 45. The front end portion of the region 41 is provided with the front end part 41a bent downward and an engaging claw 43 formed on the front end part 41a and bent upward. The front end part of the supporting frame 40 is provisionally secured to the casing 32 by press-fitting the engaging claw 43 into the concave part 34a. The front end part 41a of the front-rear extending region 41 is provided with a screw through-hole 42a through which passes the securing screw 36. An elongated hole 42b is formed on the front-rear extending region 41 at the rear side thereof for engaging the zero-point adjusting screw 60.

When the front end part 41a of the front-rear extending region 41 is secured to the casing 32 by the securing screw 36, the region to the rear of the raising part 33a of the front-rear extending region 41 of the supporting frame 40 is raised up, as shown by a phantom line in FIG. 8.

The zero-point adjusting screw 60 is engaged with the threaded hole 37 while passing through the elongated hole 42b from the top. An edge of the elongated hole 42b contacts a head part 60a of the screw 60 so that the rear end part of the supporting frame 40 is held to the casing 32 with elastically so that it is urged upward. In this condition, when the zero-point adjusting screw 60 is turned, the rear end part of the supporting frame 40 is moved up and down together with the up-down movement of the head part 60a of the screw 60. In this operation, the deviation condition of the supporting frame 40, that is, the angle of inclination of the bubble vial 50, is adjusted.

In the drawings, reference numeral 44 designates a guide piece formed by bending a side edge of the front-rear extending region 41. When the supporting frame 40 pivots, the guide piece 44 slides along the outer surface of the casing 32. Owing to the guide piece 44, the supporting frame 40 correctly pivots without deviation.

The bubble vial holding region 45 is provided with a pair of holding claws 47 bent upward. The bubble vial 50 is held between a side wall 46 of the front-rear extending region 41 and the pair of holding claws 47. A scale 52 is provided on a side surface of the bubble vial 50 for indicating the position of the bubble 54 within the vial 50. The bubble vial 50 is easily assembled with the bubble vial holding region 45 by press-fitting the vial between the side wall 46 of the front-rear extending region 41 and the pair of holding claws 47 from the top. The holding region 45 is also provided with a front contact piece 48a contacting a front end part of the bubble vial 50 and a rear contact piece 48b contacting a rear end part thereof. These contact pieces 48a, 48b define the position of the bubble vial 50 in the front-and-rear direction thereof.

The bubble vial holding region 45, which is provided with a thermally conductive piece 49 rising upward from the bottom surface of the region 45, contacts the side surface of the bubble vial 50 held by the holding claws 47. Generally, the air bubble 54 within the bubble vial 50 may deviate from the correct position due to convection of the liquid filled in the bubble vial 50 if the temperature varies in the longitudinal direction of the bubble vial. Particularly, since the bubble vial supporting frame 40 is formed of a highly thermally conductive material such as aluminum according to the invention, heat will much more readily be transmitted to the parts of the bubble vial 50 which are held by the holding claws 47 than other parts thereof. Accordingly, a difference in temperature in the longitudinal direction of the bubble vial 50 would be caused and, as a result, the bubble 54 may not indicate the correct position due to heat convection with respect to the liquid filled in the bubble vial 50. However, according to the first embodiment of the invention, since the thermally conductive contact piece 49 contacts the bubble vial 50 over most of the length thereof, the amount of heat transmitted from the supporting frame 40 to the bubble vial 50 is equalized in the longitudinal direction of the vial 50 so that convection of the liquid within the bubble vial 50 is substantially eliminated, thereby suppressing undesired shifting of the bubble 54.

As shown in FIGS. 9 and 10, a circular opening 70 is formed in an upper wall 10a of the lamp body 10 at a position just above the level device 30 mounted on the reflector 20. The opening 70 has an area corresponding to an effective range of movement of the bubble 54 within the bubble vial 50, that is, a gauge-forming area of the bubble vial 50. The opening 70 is covered by a transparent removable cap 72 functioning as a viewing window. When the level device is to be adjusted to indicate a zero-point, after removing the cap 72 as shown in FIG. 9, a screwdriver 74 is inserted into the lamp body 10 through the opening 70 and turned to rotate the screw 60.

With the aiming level device according to the first embodiment of the invention, after fixing the level device 30 to the reflector 20 of the headlamp, the orientation of which has been previously adjusted correctly, the zero-point adjusting screw 60 is rotated to adjust the bubble to correctly indicate the zero-point, and afterwards the bore 37a is filled with the filler material 38 to prevent the zero-point adjusting screw 60 from rotating undesirably and disturbing the zero-point adjustment.

Figure 11:
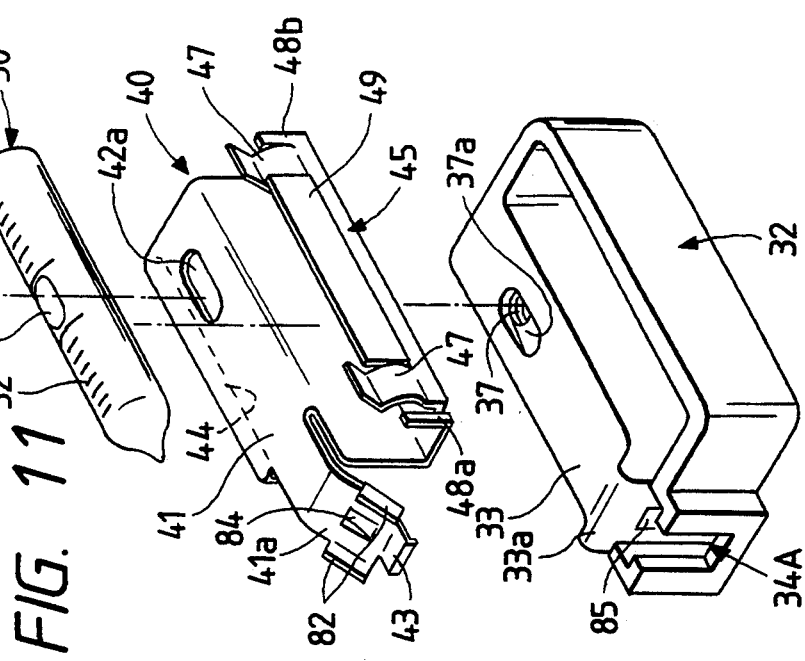
FIG. 11 is an exploded perspective view of a level device according to a second embodiment of the invention.
Figure 12:
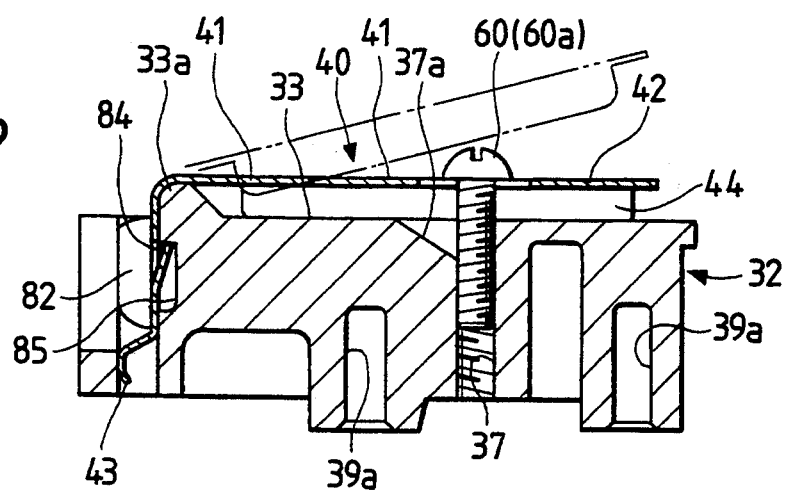
FIG. 12 is a cross-sectional view of the level device shown in FIG. 11.

FIGS. 11 and 12 show an aiming level device according to a second embodiment of the invention. Specifically, FIG. 11 is an exploded perspective view of a level device according to the second embodiment of the invention, and FIG. 12 is a cross-sectional view of the level device shown in FIG. 11. Like parts and components of the second embodiment are designated by the same reference numerals as those of the first embodiment.

According to the second embodiment of the invention, a pair of bend edges 82 are formed at the bending front end part 41a of the front-rear extending region 41 of the supporting frame 40, and an engaging claw 84 is provided at the rear surface of the front end part 41a by cutting and bending. On the other hand, a supporting frame mounting concave portion 34A of the casing 32 is shaped in such a manner as to be surrounded by side walls of the casing, and an engaging hole 85 for engaging the engaging claw 84 of the supporting frame 40 is formed on the concave portion 34A. Thus, the supporting frame securing and holding structure of the second embodiment is implemented with elastic engagement by the frame-like concave portion 34A and engaging hole 85 of the casing 32 side and the bent edges 82 and engaging claw 84 of the supporting frame side, whereas the securing and holding structure of the first embodiment is composed of the securing screw and screw through-hole 42a, as described above. Since the other parts and components of the second embodiment are the same as those of the first embodiment, a further detailed description thereof is omitted.

Figure 13:
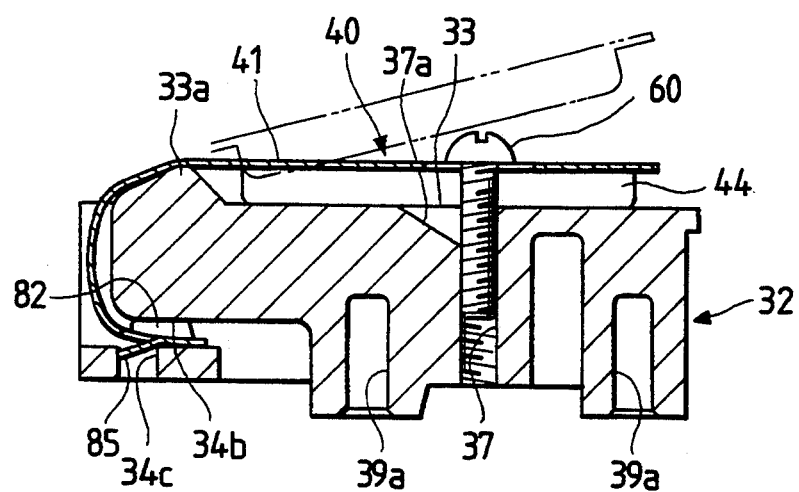
FIG. 13 is a cross-sectional view showing an aiming level device according to a third embodiment of the invention.

FIG. 13 is a cross-sectional view showing an aiming level device according to a third embodiment of the invention. Like parts and components of the third embodiment are designated by the same reference numerals as those of the first embodiment. Accordingly, a further description thereof is omitted.

In the third embodiment, as shown in FIG. 13, a front end part of the front-rear extending region 41 is bent back in an arcuate shape, and a pair of bent edges 82 formed at a rear surface of the bent back part of the front-rear extending region 41 engage with engaging holes 34b of the casing 32 so that the bent back part is elastically supported. Further, an engaging claw 85 formed by cutting and bending the front-rear extending region 41 engages with a hole 34c of the casing to prevent the front-rear extending region 41 from being detached. The bent-back part of the front-rear extending region 41 is secured to and held on the casing 32 by inserting the end part in the engaging hole 34b from the top. The other parts and components are the same as those of the first embodiment.

Figure 14:
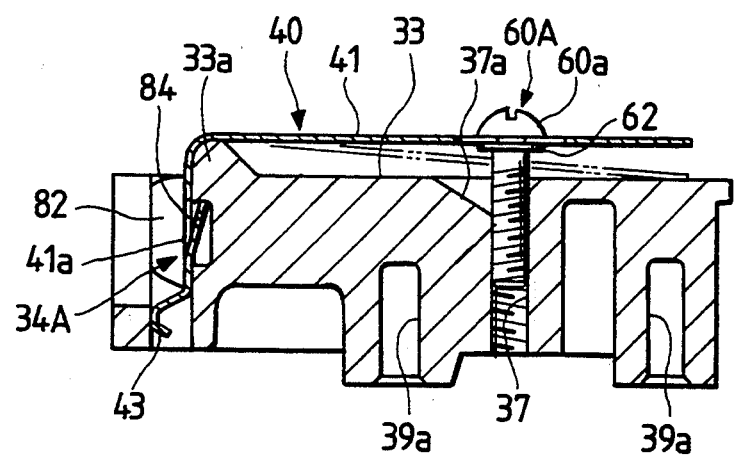
FIG. 14 is a cross-sectional view showing an aiming level device according to a fourth embodiment of the invention.

FIG. 14 is a cross-sectional view showing an aiming level device according to a fourth embodiment of the invention. Like parts and components of the fourth embodiment are designated by the same reference numerals as those of the first embodiment. Accordingly, a further description of such elements is omitted.

According to the fourth embodiment, as shown in FIG. 14, a pair of bent edges 82 are formed on the bent-back front end part 41a of the front-rear extending region 41 of the supporting frame 40, and a rear end part of the supporting frame 40 is divided into two sections for engaging the zero-point adjusting screw 60A. The screw 60A has a flange 62 threadedly engaged with a screw hole 37 of the casing 32. The two sections of the front-rear extending region 41 are engaged between the flange 62 and the head 60a of the screw 60A, so that the rear end part of the supporting frame 40 is held by the screw 60A.

In the fourth embodiment thus constructed, when the front end part 41a of the front-rear extending region 41 of the supporting frame 40 is secured to and held on the concave part 34A of the casing 32, the region of the front-rear extending region 41 at the rear side from the rising part 33a is inclined toward the holding surface 33 side, as shown by phantom lines in FIG. 14. However, since the divided two sections are engaged between the head part 60a and flange 62 of the zero-point adjusting screw 60A, the rear part of the supporting frame 40 is held by the screw 60A while being urged downward.

Figure 15:
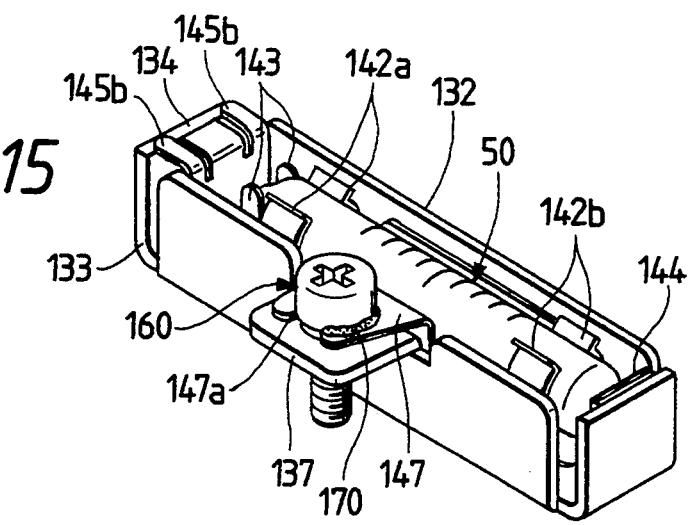
FIG. 15 is a perspective view showing an aiming level device of a fifth embodiment of the invention.
Figure 16:
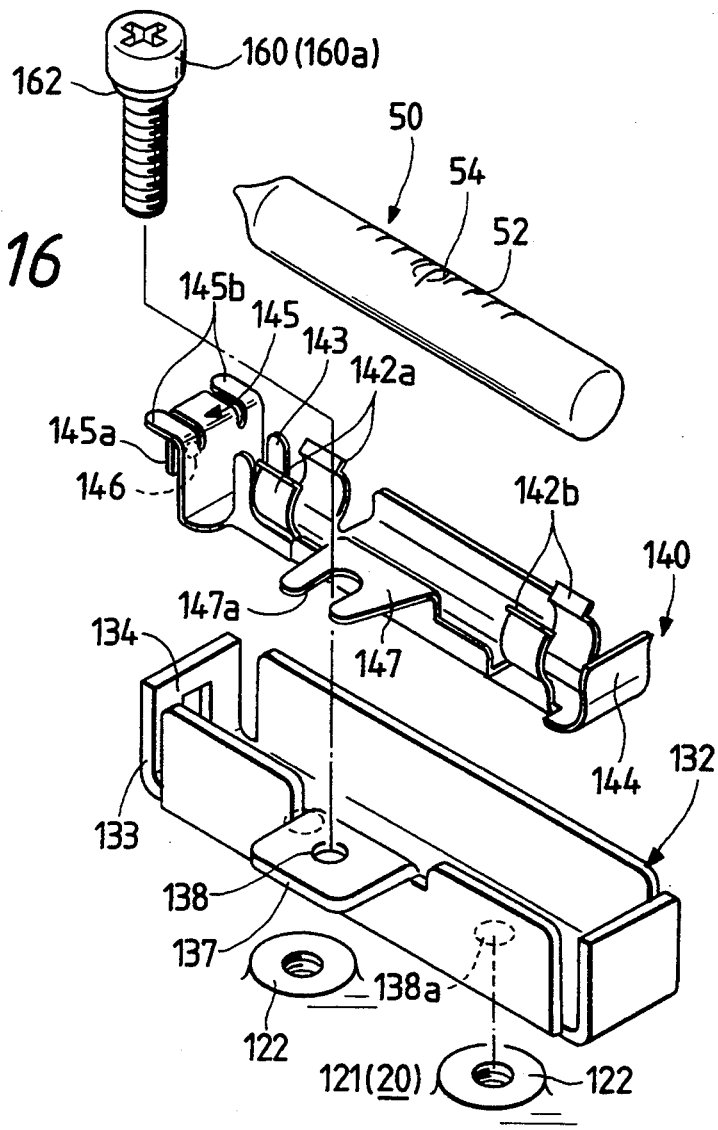
FIG. 16 is an exploded view of the level device shown in FIG. 15.

FIGS. 15 to 19 show an aiming device according to a fifth embodiment of the invention. Specifically, FIG. 15 is a perspective view showing an aiming level device of the fifth embodiment of the invention, FIG. 16 is an exploded view of the level device, FIG. 17 is a cross-sectional view showing the level device, FIG. 18 is a plan view of the level device, and FIG. 19 is a lateral cross-sectional view of the level device viewed along the line XIX—XIX in FIG. 18.

A supporting frame 140, which is formed by cutting and bending a single thin metal plate to form a desired contour, has front and rear pairs of holding claws 142a, 142b which hold a bubble vial 50 spaced apart from a bottom surface 141 of the supporting frame 140. A pair of holding pieces 143, formed by cutting and bending, rise from the bottom surface 141 of the supporting frame 140 adjacent the front holding claws 142a for holding a front part of the bubble vial 50. On the other hand, a rear end rising part 144 formed by bending a rear end of the supporting frame 140 holds the bubble vial 50 with the holding pieces 143 to define front and rear limits of the vial. A front end part 145 of the supporting frame 140 is bent upward, bent forward, and then bent downward. The front end part 145 is provided with a downward extending part 145a having an engaging claw 146 formed by cutting and bending. An upper portion of the front end rising part 145 is provided with a pair of frontward extending parts 145b. The frontward extending parts 145b and engaging claw 146 hold an opening upper edge part 134 of a front wall 133 of a casing 132 so that the supporting frame 140 pivots around the opening upper edge part 134 in the up-and-down direction.

The supporting frame 140 is also provided with a horizontal sideward extending part 147 extending outside, which forms at an end thereof two sectioned engaging parts 147a for engaging with a screw 160 between a flange 162 and head 160a thereof. On the other hand, the casing 132 is provided with a sideward extending part 137 extending from a side thereof corresponding to the sideward extending part 147 of the supporting frame 140. The screw 160 engages with a screw hole 138 formed on the sideward extending part 137 thereby to hold the supporting frame 140. The screw 160 is also used to adjust the angle of inclination of the supporting frame 140, that is, the zero-point of the bubble vial 50.

As shown in FIGS. 17, 18 and 19, a circular opening 165 is formed on an upper wall 10a of the lamp body 10. The opening 165 has an area corresponding to the effective range of movement of the bubble 54 within the bubble vial 50, that is, a gauge forming area of the bubble vial 50. The opening 165 is covered by a transparent removable cap 166 functioning as a viewing window. When the level device is to be adjusted to indicate the zero-point, after removing the cap 166 as shown in FIG. 16, a screwdriver 160 is inserted into the lamp body 10 through the opening 165 and turned to rotate the screw 160.

Figure 22:
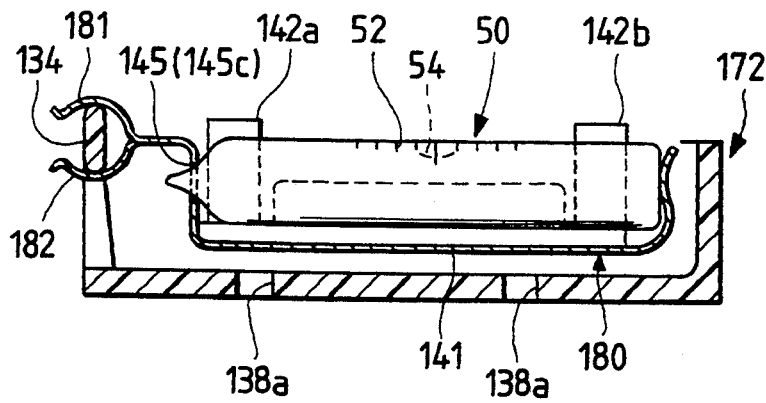
FIG. 22 is a cross-sectional view of the level device shown in FIG. 21.
Figure 23:
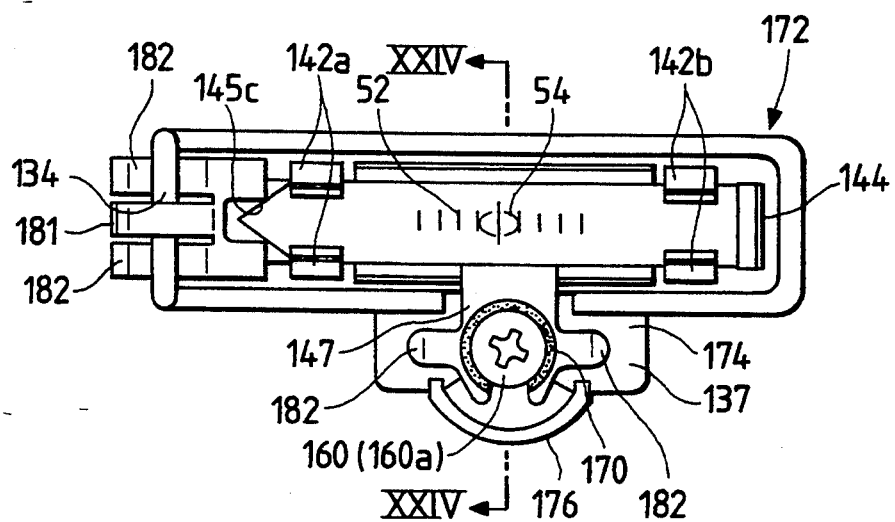
FIG. 23 is a plan view of the level device of FIG. 20.
Figure 24:
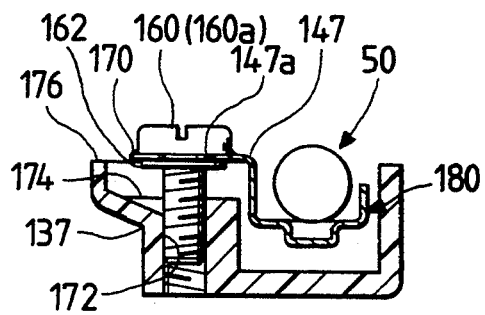
FIG. 24 is a lateral cross-sectional view of the level device shown in FIG. 21.

FIGS. 20 to 24 show an aiming device according to a sixth embodiment of the invention. Specifically, FIG. 20 is a perspective view of the aiming device according to the sixth embodiment of the invention, FIG. 21 is an exploded perspective view of the level device shown in FIG. 20, FIG. 22 is a vertical cross-sectional view of the level device, and FIG. 23 is a lateral cross-sectional view of the level device viewed along the line XXIX—XXIX in FIG. 22.

The structure of the aiming device according to the sixth embodiment is substantially the same as that of the fifth embodiment, except for the following points.

First, the casing 172 is formed of a synthetic resin which suppresses transmission of heat generated by the bulb 13 to the bubble vial 50.

Second, the front end rising part 145 of the supporting frame 180 is provided with an opening part 145c for holding a front end portion of the bubble vial 50. A front end part of the supporting frame 180 is cut and bent to form an upper forward extending part 181 acting as a plate spring and a pair of lower forward extending parts 182 located at the side of the upper forward extending part 181. The upper and lower forward extending parts 181 and 182 hold the opening upper edge part 134 so that the supporting frame 180 can pivot around the opening upper edge part 134 in the up-and-down direction.

Third, the supporting frame 180 is also provided with a horizontal sideward extending part 187 extending outside. On the other hand, the casing 172 is provided with a sideward extending part 137 extending from a side thereof corresponding to the sideward extending part 187 of the supporting frame 180. The sideward extending part 187 is provided with a pair of lower bending parts 187b, functioning as a plate spring, elastically pressing against a seat surface 174 of the casing 172. The two-section engaging part 187a engages a head 160a of the screw 160 while being elastically urged upward so that the sideward extending part 147 is properly positioned in the vertical direction. The sideward extending part 137 is also provided with a wall 176 rising from a peripheral edge thereof for preventing the screw 160 from unintentionally rotating.

The other components and structure of the sixth embodiment are the same as those of the fifth embodiment and, accordingly, a further description is omitted.

Figure 25:
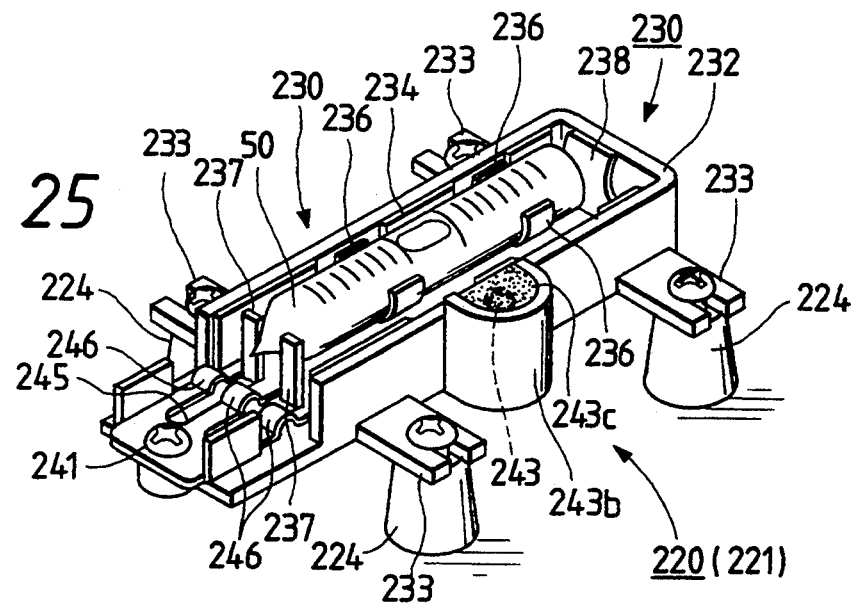
FIG. 25 is a perspective view showing an aiming device according to a seventh embodiment of the invention.
Figure 26:
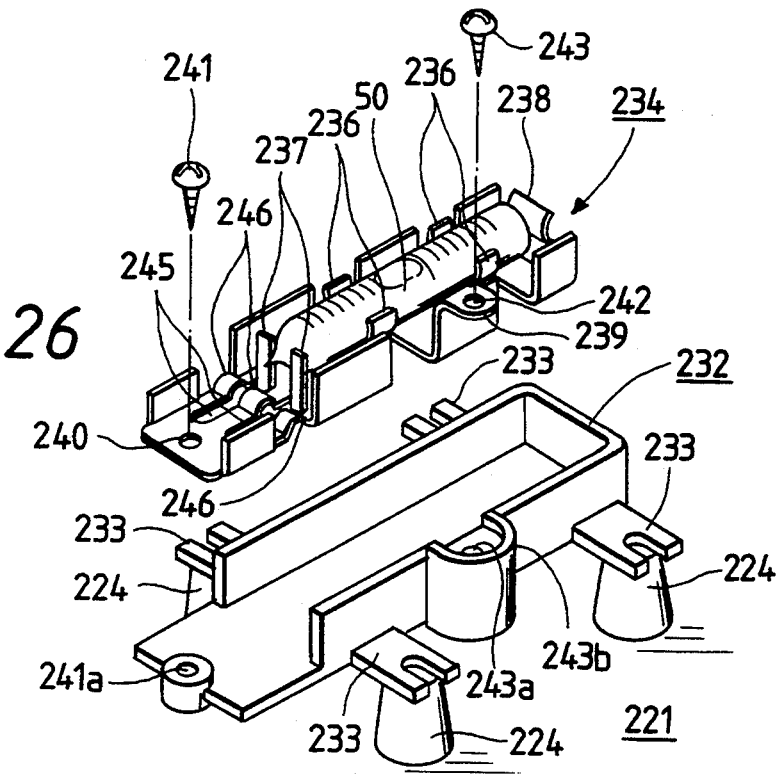
FIG. 26 is an exploded perspective view of the level device shogun in FIG. 25.
Figure 27:
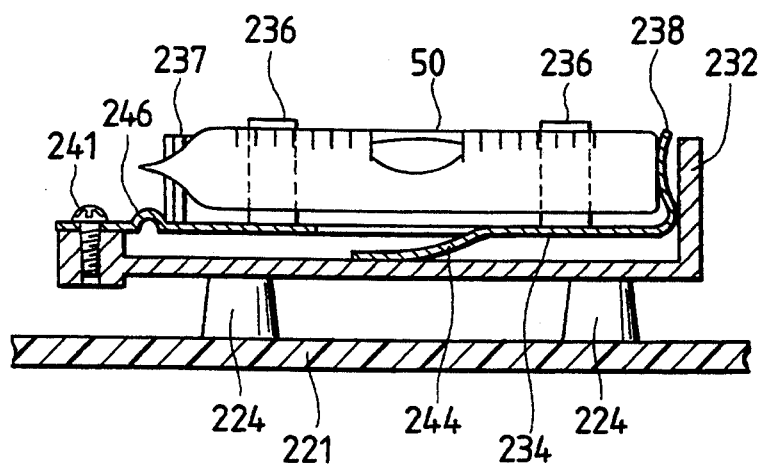
FIG. 27 is a vertical sectional view of the level device of the seventh embodiment.

FIGS. 25 to 27 show an aiming device according to a seventh embodiment of the invention. Specifically, FIG. 25 is a perspective view showing an aiming device according to the seventh embodiment, FIG. 26 is an exploded perspective view of the level device shown in FIG. 26, and FIG. 27 is a vertical sectional view of the level device.

A level device 230 according to the seventh embodiment of the invention is constituted by a rectangular-shaped casing 232 having an opening directed upward, a supporting frame 234 acting as a plate spring and fixedly accommodated in the casing 132, and a bubble vial 50 supported by the supporting frame 234. The casing 132 is provided with two pairs of brackets 233 extending laterally therefrom, which brackets are connected by screws to respective bosses 224 projecting from an upper wall 221 of the reflector. The supporting frame 234 is provided with a pair of holding arms 236 for holding the bubble vial 50 at two positions in the longitudinal direction thereof. The holding arms 236 are formed by cutting and bending a generally central portion of the supporting frame 234. The bubble vial 50 is supported at a front and rear side thereof by a pair of rising parts 237 at the front side and a bent part 238 at the rear side of the supporting frame 234. Screw holes 240 and 242 are formed in the supporting frame 234 at the front side and outer bent side, respectively, of the bottom thereof. The front side of the supporting frame 234 is secured by a securing screw 241 passing through the front screw hole 240, whereas the outer bent side is connected to screw holes 241a, 243a formed in the casing 232 through the outer screw holes 242 by an adjusting screw 243. At the bottom of the supporting frame 234, as shown in FIG. 27, a plate spring piece 244 is formed by cutting and bending downward the supporting frame 234, so that the rear end portion of the supporting frame 234 is urged upward by the elastic force of the plate spring piece 244.

By cutting and bending the rising parts 237, a pair of strip-like notches 245 are formed between the screw hole 241a formed on the bottom of the casing 232 and the front rising part 237, and a hinge part 246 curving upward is also formed, so that the supporting frame 234 readily pivots with respect to the hinge part 246. Owing to this structure, when the adjusting screw 243 is loosened, the rear end part of the supporting frame 234 rises due to the elastic force of the plate spring piece 244, thereby to adjust the inclination angle of the bubble vial 50, that is, the zero-point of the level device.

During assembly of the level device according to the seventh embodiment of the invention, the supporting frame 234 is assembled to the casing 232 after assembling the bubble vial to the holding part 236 of the supporting frame 234. Otherwise, the bubble vial 50 may be assembled to the holding part 236 of the supporting frame 234 after assembling the supporting frame 234 to the casing 232. Particularly, if the bubble vial 50 is assembled after assembling the supporting frame 234 to the casing 232 and then the zero-point of the level device is adjusted, only a single operation of rotating the adjusting screw 243 is needed. In this case, the required time for assembly and adjustment is effectively reduced.

At a boss part of the casing 234 contacting the outer bending part 39 of the supporting frame 234 there is provided a cylindrical part 243b extending upward so as to surround the screw hole 243a. After screwing in the adjusting screw 243, an adhesive 243c is applied to the screw 243 to cover the head of the screw 243 so as to prevent the screw 243 from rotating unintentionally. This is advantageous because if the screw 243 is erroneously rotated after adjusting the zero-point of the level device, the zero-point adjustment is disturbed and must be adjusted again, which is inconvenient.

Figure 28:
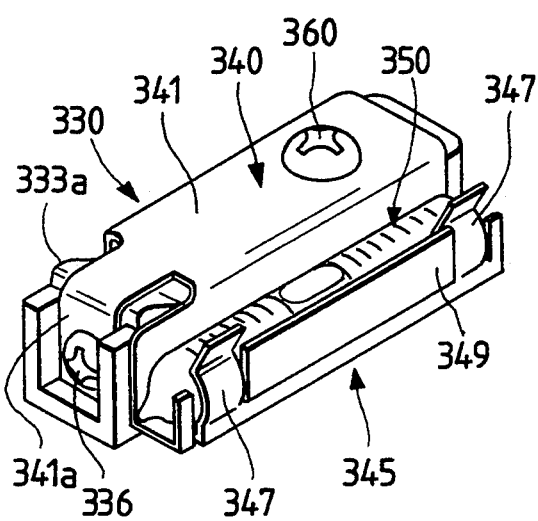
FIG. 28 is a perspective view showing a level device according to an eighth embodiment of the invention.
Figure 29:
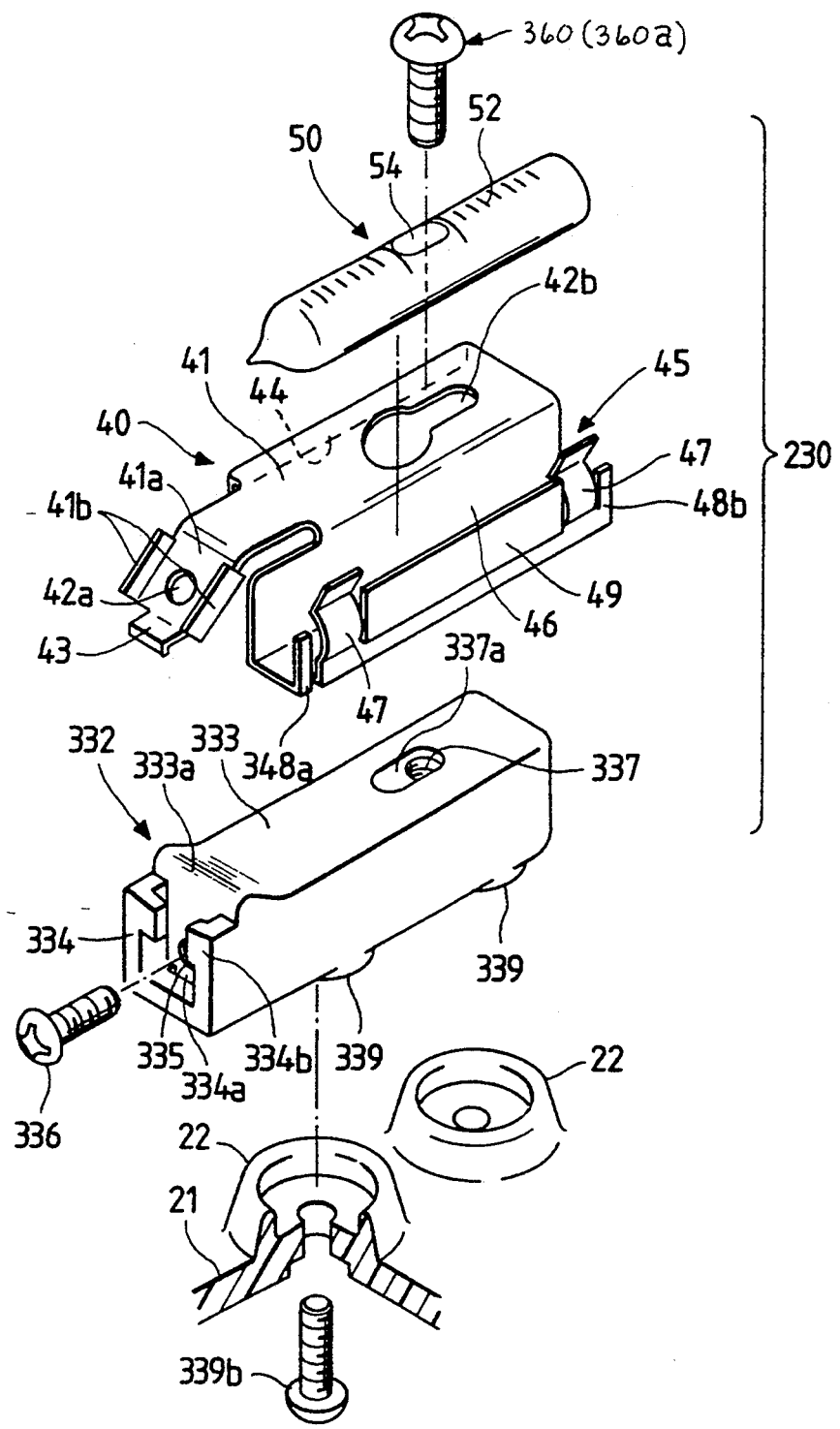
FIG. 29 is an exploded perspective view showing the level device of FIG. 28.
Figure 30:
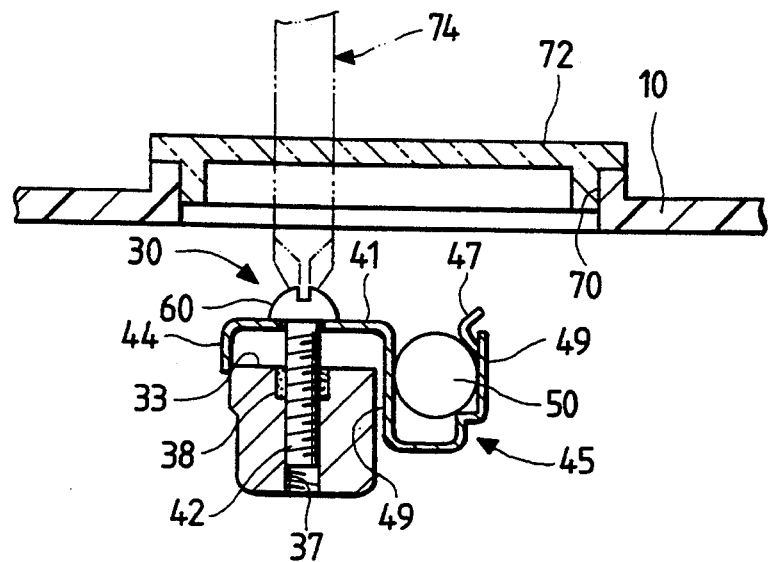
FIG. 30 is a lateral cross-sectional view showing the level device of the eighth embodiment.
Figure 31:
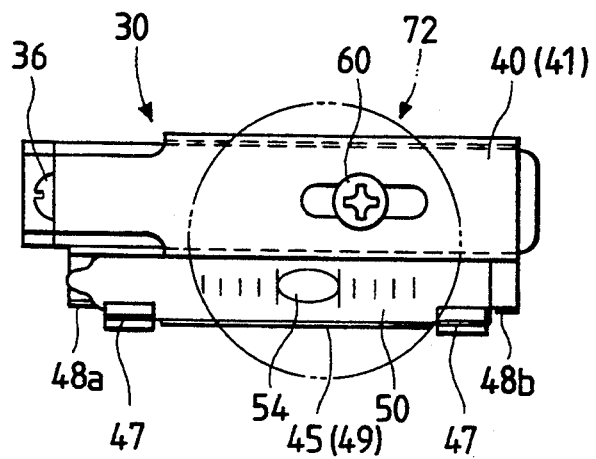
FIG. 31 is a plan view showing a zero-point adjusting screw and viewing window of the eighth embodiment.

FIGS. 28 to 31 show an aiming device according to an eighth embodiment of the invention. Specifically, FIG. 28 is a perspective view showing a level device for aiming according to the eighth embodiment of the invention, FIG. 29 is an exploded perspective view showing the level device shown in FIG. 28, FIG. 30 is a lateral cross-sectional view showing the level device, and FIG. 31 is a plan view showing a zero-point adjusting screw and viewing window. Like parts and components of the eighth embodiment are designated by the same reference numerals as those of the first embodiment. Accordingly, a further detailed description is omitted.

A supporting base 332 is formed of a synthetic resin such as PPS resin which is light in weight and has a good thermal resistance. The supporting base 332 has formed on an upper surface thereof a generally flat supporting frame receiving surface 333 extending frontward and rearward of the supporting frame 40. The supporting frame 40 mounted on the supporting base 332 is provided with a bubble vial holding region 45 extending frontward and rearward along the supporting base 332. The bubble vial 50 is supported in the bubble vial holding region 45. The supporting base 332 is provided at a front end portion thereof with an concave portion 334 for mounting thereon and fixing thereto the supporting frame 40. The concave portion 334 is provided with a pair of projections 334b projecting inwardly from both side walls of the concave portion 334. A bent end portion 41a of the supporting frame 40 is provided with a pair of bent edges 41b and mounted on the concave portion 334. A threaded hole 335 is formed in the concave portion 334 of the supporting base 332, into which hole a securing screw 336 is screwed so that the bent portion 41a of the supporting frame 40 is secured to and held by the concave portion 334. A concave part 334a is formed at the bottom surface of the concave portion 334 for engaging an engaging claw 43 extending forward from the front end portion 41a of the supporting frame 40.

Reference numeral 333a designates a raising part formed at a front end portion of the supporting frame receiving surface 333, along which part the supporting frame 40 pivots vertically. A threaded hole 337 is formed on the supporting frame receiving surface 333 at the rear side thereof (opposite to the side of the raising part 333a), and a zero-point adjusting screw 360 is screwed into the threaded hole 337. A cup-shaped bore 337a is formed around the threaded hole 337, and a silicone filler material 338 is filled in the threaded hole 337 through the bore 337a to prevent the zero-point adjusting screw 360 engaged with the threaded hole 337 from undesirably rotating due to vibration or the like. Since the bore 337a is cup-shaped, the filler material 338 is accurately filled in the threaded hole 337 located at the lowermost portion of the bore 337a.

Further, as shown in FIG. 28, an engaging convex portion 339 and a screw through-hole 339a are formed at a left-lower surface of the base 332 for engaging with a boss 22 projecting from an upper wall 21 of the reflector 20, so that the supporting base 332 is secured to the upper wall 21 of the reflector 20 by a securing screw 339b.

The other components and structure of the eighth embodiment is the same as those of the first embodiment and accordingly a further description thereof is omitted.

Figure 32:
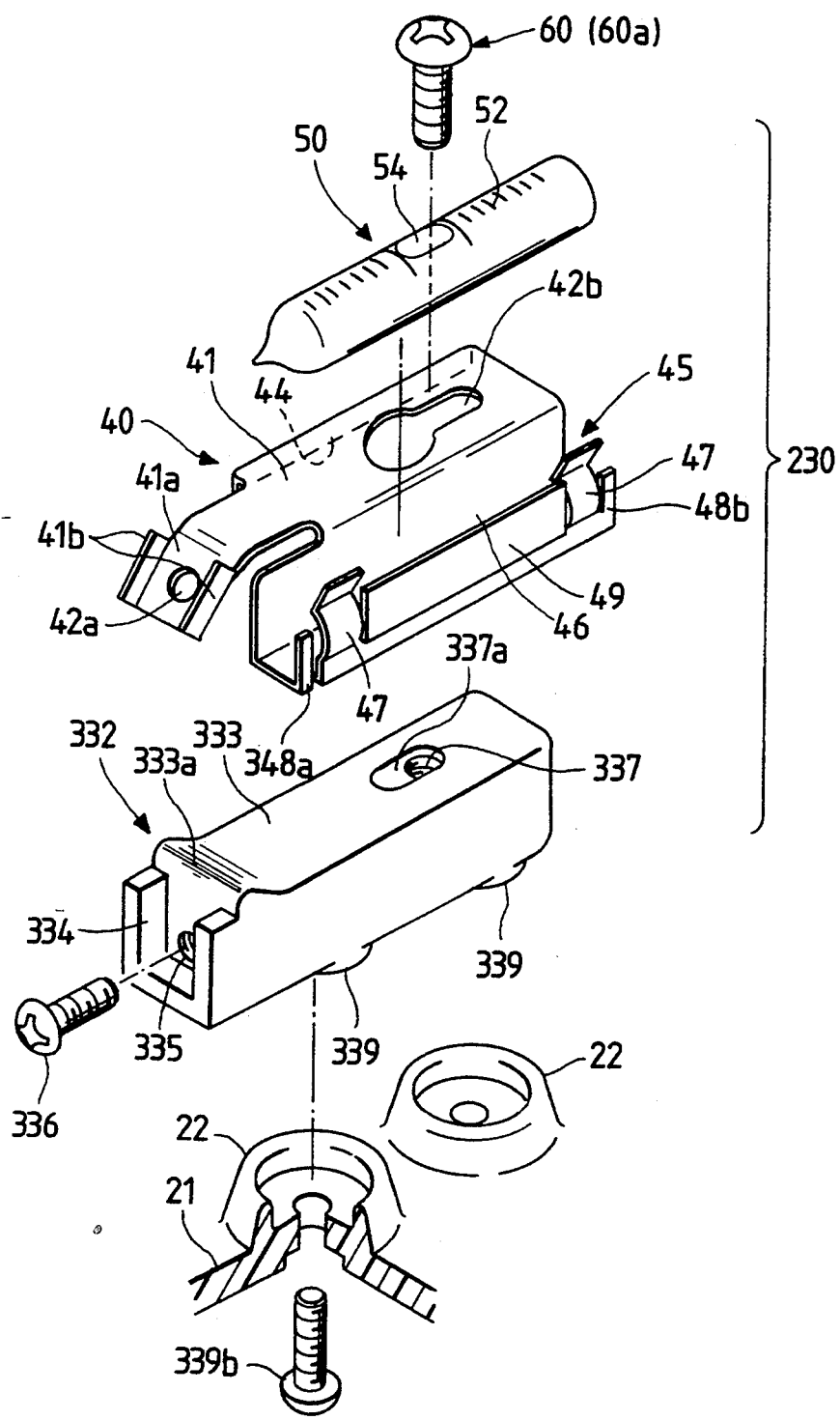
FIG. 32 is an exploded perspective view showing an arrangement of the level device according to the eighth embodiment shown in FIG. 29.

FIG. 32 is an exploded perspective view showing an arrangement of the level device according to the eighth embodiment shown in FIG. 29. According to this arrangement, the engaging claw 43 of the supporting frame 40 is eliminated while the concave part 334a for receiving the claw 43 and the projections 334b are also eliminated.

Figure 33:
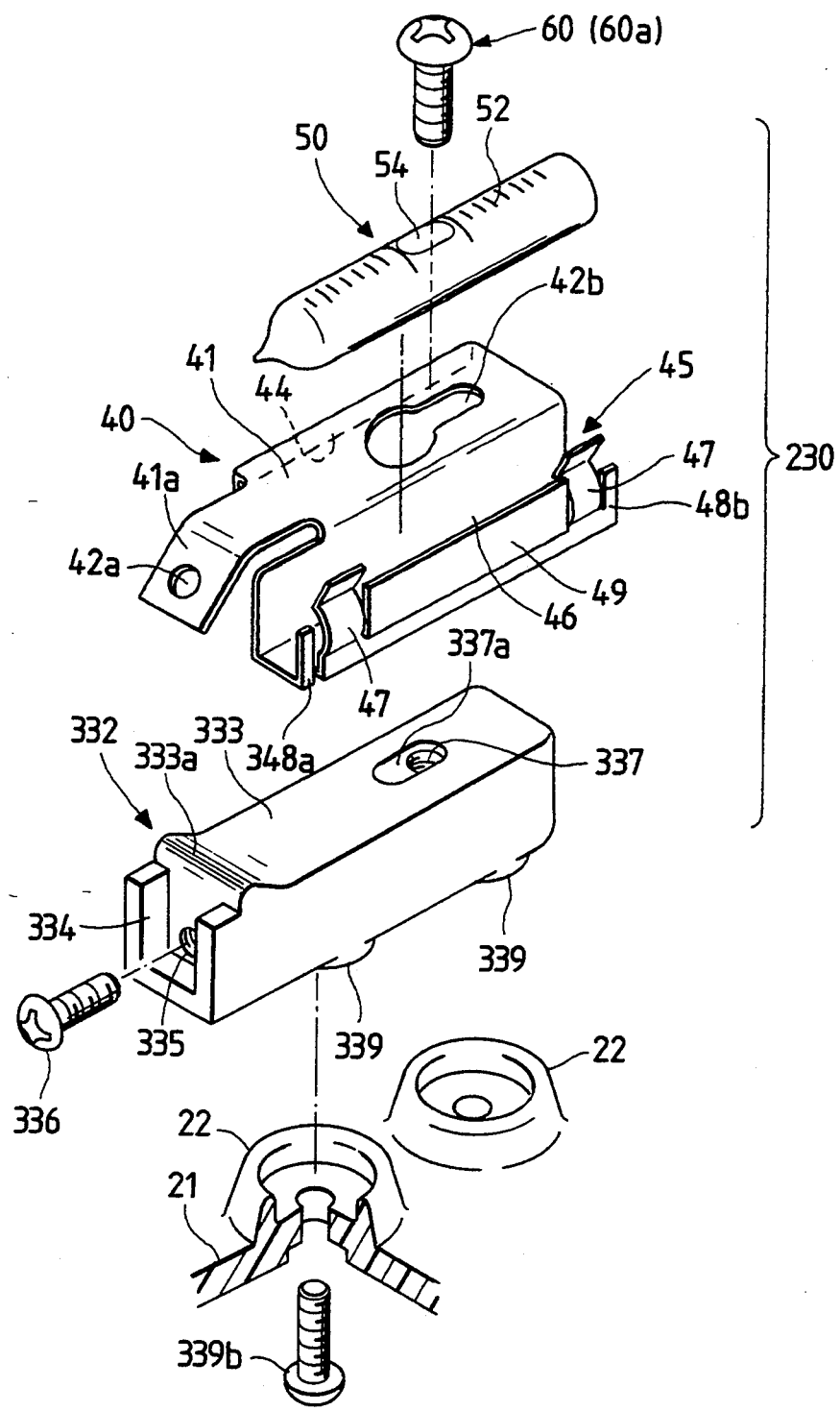
FIG. 33 is another exploded perspective view showing an arrangement of the level device according to the eighth embodiment shown in FIG. 29.

FIG. 33 is another exploded perspective view showing an arrangement of the level device according to the eighth embodiment shown in FIG. 29. This arrangement is similar in structure to the arrangement shown in FIG. 32. However, from the arrangement of FIG. 32, the pair of bend edges 41b of the bent end portion 41a of the supporting frame 40 are further eliminated.

Figure 34:
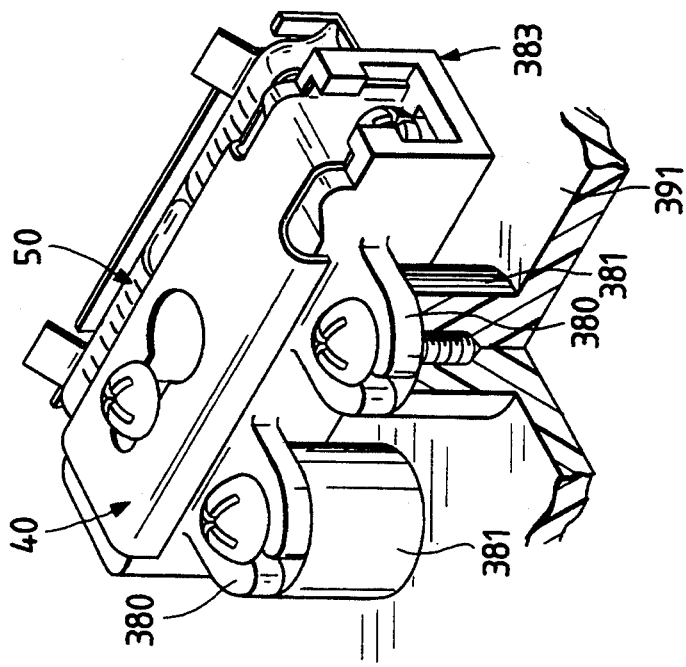
FIG. 34 is perspective, partially sectional view showing an arrangement of a mounting portion of the casing onto a reflector according to the eighth embodiment shown in FIG. 29.

FIG. 34 is perspective, partially sectional view showing an arrangement of a mounting portion of the supporting base onto a reflector according to the eighth embodiment shown in FIG. 29. In this arrangement, a supporting base 383 of the level device has a pair of brackets 380 extending laterally therefrom, which brackets are connected by screws 382 to respective bosses 381 projecting from an upper wall 391 of the reflector. The bosses 381 may be formed with the upper wall 391 of the reflector either integrally or separately.

Figure 35:
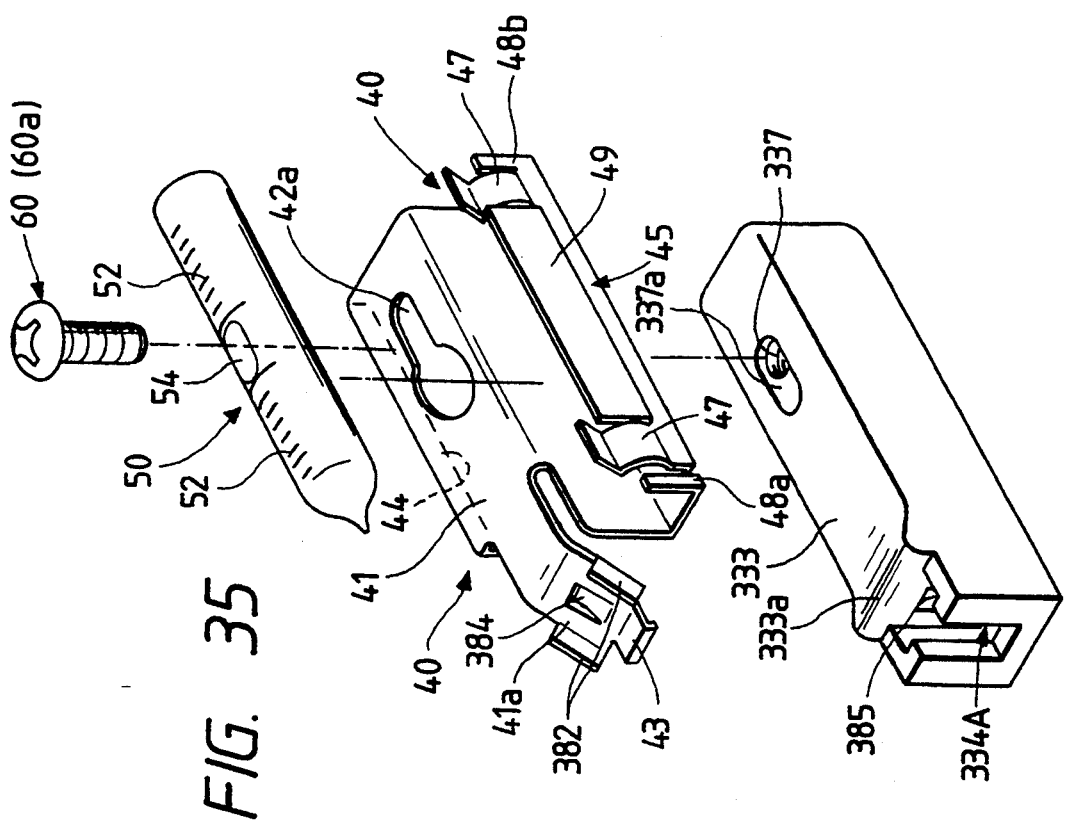
FIG. 35 is an exploded perspective view showing a level device according to a ninth embodiment of the invention.

FIG. 35 is an exploded perspective view showing a level device according to a ninth embodiment of the invention.

In this embodiment, a pair of bent edges 382 are formed at the bent front end part 41a of the front-rear extending region 41 of the supporting frame 40, and an engaging claw 384 is formed at the rear surface of the front end part 41a by cutting and bending. On the other hand, a supporting frame mounting concave portion 334A of the supporting base 332 is shaped so as to be surrounded by side walls of the base, and an engaging hole 385 for engaging with the engaging claw 384 of the supporting frame 40 is formed in the concave portion 334A. Thus, the supporting frame securing and holding structure of the ninth embodiment provides elastic engagement by the frame-like concave portion 334A and engaging hole 385 of the supporting base 332 side and the bent edges 382 and engaging claw 384 of the supporting frame side, whereas the securing and holding means of the eighth embodiment includes the securing screw and screw through-hole 42a as described above. Since the other parts and components of the ninth embodiment are the same as those of the eighth embodiment, a further detailed description is omitted.

Although the embodiments described above relate to a level device applicable to a headlamp of a movable reflector type, the invention may also be applied to a headlamp of a unit movable type in which a unitary lamp body and reflector is pivotably supported by an aiming mechanism with respect to a lamp housing. That is, the casing 32 or base 332 is secured to an upper wall of the unit of lamp body and reflector of the movable unit type, and the level device is mounted on the unit of lamp body and reflector. The level device itself is entirely the same as that described in this specification. Further, the supporting base may be formed integrally with the reflector or headlamp directly. In this case, no mounting member for mounting the supporting base onto the reflector is required.

As described above, according to the aiming level device for a motor vehicle headlamp of the present invention, since the bubble vial supporting frame (one of the components of the level device) is formed by cutting and bending a single thin metal plate, the shape of which can freely be designed in contrast to that formed of synthetic resin, significant manufacturing costs can be saved.

Further, since the bubble vial supporting frame holds the bubble vial by bubble vial holding parts continuously formed at the side of the front-rear extending region of the frame so as to support the bubble vial at front and rear portions thereof, the length of the bubble vial supporting frame, that is, the entire length of the level device, is significantly reduced. Accordingly, the level device of the invention can be applied to a compact headlamp, especially a headlamp having a short depth.

Furthermore, since the supporting frame is provided at the side of the bubble vial holding parts with the front-rear extending region extending parallel to the bubble vial, and since the front end part or rear end part of the front-rear extending region is supported by the zero-point adjusting screw which can be moved up and down by turning the screw, the zero-point adjusting screw can be located adjacent the effective moving range of the bubble within the bubble vial, not far from the ends of the bubble vial. Owing to this structure, the transparent viewing window for reading the gauge disposed on the bubble vial can be made small in size in the case of a headlamp of the movable reflector type, thereby to suppress the leakage of light. Moreover, since the viewing window is small, it is easy to form the window during assembly.

Further, since the aiming level device of the invention is constituted merely by four components, that is, the casing or base, the bubble vial supporting frame pivotable with respect to the casing (or base), the zero-point adjusting screw for holding the sideward extending part of the supporting frame, and the elongated bubble vial supported by the supporting frame, the number of components is very small. This aids in reducing manufacturing costs.

What is claimed is:

1. An aiming device for a motor vehicle headlamp for measuring an amount of deviation of a light beam from said headlamp, comprising:
    a body member attached to a reflector of a headlamp;
    a bubble vial including a level gauge for indicating said amount of deviation of said light beam;
    a supporting frame comprising an engaging portion for supporting said bubble vial and an end portion for coupling said supporting frame to said body member;
    an adjusting screw having a stop portion rotatably engaged with said supporting frame and being threadedly engaged with a first threaded hole formed in said body member for adjusting an angular position of said supporting frame relative to said body member, said adjusting screw being located adjacent substantially a middle portion of said bubble vial; and
    means for engaging said end portion of said supporting frame with said body member, sand engaging means comprising a second screw, said second screw passing through a second aperture formed in said supporting frame and being threadedly engaged with a second threaded hole formed in said body member.

2. An aiming device for a motor vehicle headlamp for measuring an amount of deviation of a light beam from said headlamp, comprising:
    a body member attached to a reflector of a headlamp;
    a bubble via including a level gauge for indicating said amount of deviation of said light beam;
    an adjusting screw having a stop portion rotatably engaged with said supporting frame and being threadedly engaged with a threaded hole formed in said body member for adjusting an angular position of said supporting frame relative to said body member, said adjusting screw being located adjacent substantially a middle portion of said bubble vial; and
    a supporting frame comprising an engaging portion for supporting said bubble vial and an end portion for coupling said supporting frame to said body member, said supporting frame being formed from a resilient plate material, and being bent so as to engage a stop portion of said adjusting screw with spring force, said body member comprising a raised portion upon which said supporting frame pivots, whereby rotation of said adjusting screw adjusts an angular position of said supporting frame relative to said body member.

3. An aiming device for a motor vehicle headlamp for measuring an amount of deviation of a light beam from said headlamp, comprising:
    a body member attached to a reflector of a headlamp;
    a bubble vial including a level gauge for indicating said amount of deviation of said light beam;
    a supporting frame comprising an engaging portion for supporting said bubble vial and an end portion for coupling said supporting frame to said body member, said engaging portion being formed at an outer side of said body member; and
    an adjusting screw having a stop portion rotatably engaged with said supporting frame and being threadedly engaged with a threaded hole formed in said body member for adjusting an angular position of said supporting frame relative to said body member, said adjusting screw being located adjacent substantially a middle portion of said bubble vial.

4. An aiming device for a motor vehicle headlamp for measuring an amount of deviation of a light beam from said headlamp, comprising:
    a body member attached to a reflector of a headlamp;
    a bubble vial including a level gauge for indicating said amount of deviation of said light beam;
    a supporting frame comprising an engaging portion for supporting said bubble vial and an end portion for coupling said supporting frame to said body member, a hole being formed in said end portion of said supporting frame, a concave part being formed in an end portion of said body member and a slot-like concave part being formed at a bottom surface of said concave portion, an engaging claw being formed on said end portion of said supporting frame, said claw portion being engaged with said concave part;
    an adjusting screw having a stop portion rotatably engaged with said supporting frame and being threadedly engaged with a first threaded hole formed in said body member for adjusting an angular position of said supporting frame relative to said body member, said adjusting screw being located adjacent substantially a middle portion of said bubble vial; and
    a securing screw passing through said hole in said end portion of said supporting frame, a second threaded hole being formed in said body member in said concave part, said securing screw being screwed into said second threaded hole to fix said end portion of said supporting frame to said body member.

5. An aiming device for a motor vehicle headlamp for measuring an amount of deviation of a light beam from said headlamp, comprising:
    a body member attached to a reflector of a headlamp,
    a bubble vial including a level gauge for indicating said amount of deviation of said light beam;
    a supporting frame comprising an engaging portion for supporting said bubble vial and an end portion for coupling said supporting frame to said body member, a hole being formed in said end portion of said supporting frame, a concave part being formed in an end portion of said body member and a slot-like concave part being formed at a bottom surface of said concave portion, an engaging claw being formed on said end portion of said supporting frame, said claw portion being engaged with said concave part, a raised part being formed on said body member at an end thereof adjacent said concave part, said supporting frame being pivoted on said raised part; and an adjusting screw having a stop portion rotatably engaged with said supporting frame and being threadedly engaged with a first threaded hole formed in said body member for adjusting an angular position of said supporting frame relative to said body member, said adjusting screw being located adjacent substantially a middle portion of said bubble vial.

6. The aiming device of any one of claims 1–5, wherein said body member is fixed to a rear surface portion of said reflector.

7. The aiming device of any one of claims 1–5, wherein said adjusting screw passes through an aperture in said supporting frame.

8. The aiming device of claim 1, wherein said engaging means comprises a bent portion of said supporting frame.

9. The aiming device of claim 1, wherein said second screw extends substantially perpendicular to said adjusting screw.

10. The aiming device of claim 1, wherein said second screw and said adjusting screw are arranged on a line substantially parallel with a longitudinal direction of said body member.

11. The aiming device of any one of claims 1–5, wherein said engaging portion is U-shaped in cross section.

12. The aiming device of any one of claims 1–5, wherein said engaging portion comprises claws for holding said bubble vial.

13. The aiming device of any one of claims 1, 2, and 3, wherein said body member comprises a concave portion for receiving said end portion of said supporting frame.

14. The aiming device of any of claims 1–5, wherein a longitudinal direction of said engaging portion of said supporting frame is parallel with that of said body member.

15. The aiming device of claim 1, wherein a longitudinal direction of said engaging portion of said supporting frame is parallel with a line connecting between said second screw and said adjusting screw.

16. The aiming device of any of claims 1–5, wherein said supporting frame has front and rear holding claws for holding said bubble vial spaced apart from a bottom surface of said supporting frame.

17. The aiming device of claim 16, wherein said supporting frame further has front end rising pieces rising from said bottom surface of said supporting frame adjacent a front pair of said holding claws for holding a front part of said bubble vial.

* * * * *